United States Patent
Huang et al.

(10) Patent No.: US 9,704,254 B2
(45) Date of Patent: Jul. 11, 2017

(54) STEREO IMAGE MATCHING BY SHAPE PRESERVING FILTERING OF A COST VOLUME IN A PHASE DOMAIN

(71) Applicant: Intel Corporation, Santa Clara, CA (US)

(72) Inventors: Yu Huang, Sunnyvale, CA (US); Prasad Modali, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 14/671,883

(22) Filed: Mar. 27, 2015

(65) Prior Publication Data

US 2016/0284090 A1    Sep. 29, 2016

(51) Int. Cl.
*G06T 15/00*    (2011.01)
*G06T 7/00*    (2017.01)
*H04N 13/00*    (2006.01)
*G06T 7/593*    (2017.01)

(52) U.S. Cl.
CPC ............ *G06T 7/0075* (2013.01); *G06T 7/593* (2017.01); *H04N 13/0011* (2013.01); *G06T 2207/20056* (2013.01); *G06T 2207/20064* (2013.01)

(58) Field of Classification Search
CPC ................. G06T 7/0075; G06T 2207/10012
See application file for complete search history.

(56) References Cited

U.S. PATENT DOCUMENTS

2013/0266210 A1*  10/2013  Morgan-Mar ........ G06T 7/0051
                                                                382/154

OTHER PUBLICATIONS

D.J. Fleet, "Disparity from local weighted phase-correlation". IEEE International Conference on Systems, Man and Cybernetics, San Antonio, Texas, Oct. 1994, pp. 48-56.
J Zhou et al., "Quaternion wavelet phase based stereo matching for uncalibrated images", Pattern Recognition Letters Sep. 28, 2007, pp. 1509-1522.
C. Rhemann et al., "Fast cost-volume filtering for visual correspondence and beyond". In CVPR, 2011, pp. 3017-3024.
X. Mei et al.,"Segment-tree based cost aggregation for stereo matching". In CVPR, 2013, pp. 313-320.
K.-J. Yoon et al., "Adaptive support-weight approach for correspondence search". IEEE Transactions on Pattern Analysis and Machine Intelligence, vol. 28., No. 4., Apr. 2006, pp. 650-656.
Q. Yang. "A non-local cost aggregation method for stereo matching". In CVPR, 2012, 8 pages.
D Min et al., "Cost Aggregation and Occlusion Handling With WLS in Stereo Matching", IEEE Transactions on Image Processing, vol. 17, No. 8, Aug. 2008, pp. 1431-1442.
K Zhang et al., "Cross scale cost aggregation for stereo matching", In CVPR 2014, 8 pages.

* cited by examiner

*Primary Examiner* — Brian P Werner
(74) *Attorney, Agent, or Firm* — Green, Howard & Mughal LLP

(57) ABSTRACT

Techniques related to stereo image correspondence are discussed. Such techniques may include determining a filtered cost volume for stereo images using phase domain based costs and selecting disparity values for pixel locations based on the filtered cost volume. The filtered cost volume may be generated based on phase matching costs in single or multi-resolution.

25 Claims, 9 Drawing Sheets

STEREO IMAGE MATCHING BY SHAPE PRESERVING FILTERING OF A COST VOLUME IN A PHASE DOMAIN

BACKGROUND

In imaging processing contexts such as computer stereo vision, 3-dimensional (3D) information may be extracted from 2-dimensional (2D) images. For example, by comparing information about a scene from two or more vantage points, 3D information may be generated by examining the relative position of objects. The 3D information may be provided, for example, as a disparity map or depth map or the like having a channel that contains information relating to the distance of a pixel position from a viewpoint or plane (e.g., a nominal focal plane) or the like.

In extracting such 3D information, the fundamental task of processing a stereo pair of images may be to perform stereo correspondence, which may determine which parts of one image (e.g., a left image) correspond to parts of another image (e.g., a right image). For example, a stereo matching pipeline may include pre-processing (e.g., domain transformation), cost computation (e.g., application of a similarity metric), cost aggregation (e.g., across a support window), disparity/depth estimation (e.g., local and/or global), and post-processing (e.g., refinement). In some implementations, the definition of the cost function (e.g., for cost computation) based on the specific transform being implemented and the cost volume filtering implemented in cost aggregation may largely determine the stereo matching performance.

It may be advantageous to perform stereo correspondence with greater accuracy in the resultant disparity map for improved computer stereo vision processing. It is with respect to these and other considerations that the present improvements have been needed. Such improvements may become critical as the desire to provide 3D image characteristics becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
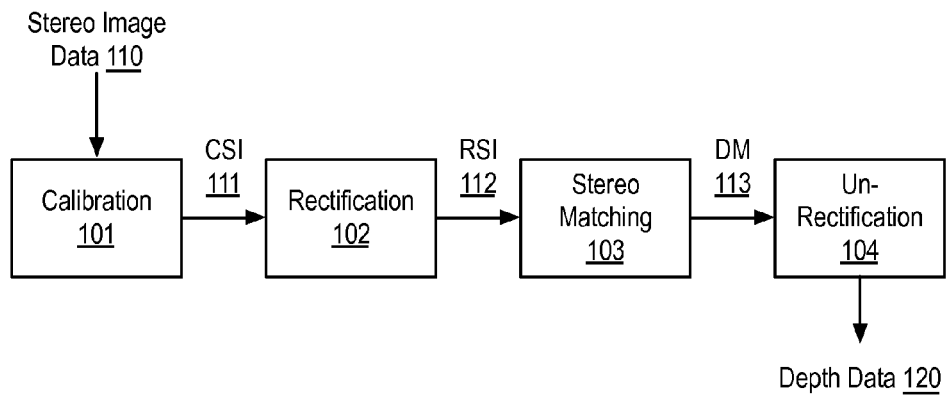
FIG. 1 illustrates an example device for performing stereo image correspondence.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to stereo image correspondence and, in particular, to performing stereo image correspondence based on filtered phase matching based costs.

As described above, in image processing contexts such as computer stereo vision, stereo correspondence may be a fundamental task. Such a stereo correspondence may determine parts of one image that correspond to parts of another image. For example, the correspondence may be described in a disparity map, which may describe the distance between corresponding points in a pair of stereo images. In some implementations, the definition of the cost function (e.g., for cost computation) based on the specific transform being implemented and the cost volume filtering implemented in cost aggregation may largely determine the stereo matching performance. As discussed, it may be advantageous to perform stereo correspondence with greater accuracy in the resultant disparity map for improved computer stereo vision processing.

In some embodiments discussed herein, performing stereo image correspondence may include transforming the stereo images (e.g., left and right images, reference and corresponding image, first and second image or the like) from the spatial domain to a phase domain. For example, the transform may include a Fourier transform, a wavelet transform, or the like. Phase matching based costs may be determined in the phase domain such that the phase matching based costs are associated with pixel locations of the first image and disparity values with respect to the second image. For example, the phase matching based costs may be based on a phase difference in the phase domain after transform. A filtered cost volume may be generated based on the phase matching based costs.

The filtered cost volume may include, for example, a volume of costs each associated with a particular pixel location and a particular disparity value. The volume may have a size (e.g., H×W×D) based on the dimension of the image being processed (e.g., H×W) and the number of disparity values being evaluated (e.g., D). In some examples, the phase matching based costs may be single resolution and the filtered cost volume may be generated based on applying a filter to the phase matching based costs. In other examples, the phase matching based costs may be in multi-resolution (e.g., including costs at multiple resolutions of the stereo images). In such examples, the filtered cost volume may be generated by applying filters at each resolution to generate scaled filtered cost volumes (e.g., one filtered cost volume for each resolution or scale) and determining the filtered cost volume based on the scaled filtered cost volumes. For example, the filtered cost volume may be generated using coarse to fine (CTF) techniques, cross scale volume filtering techniques, or the like based on the scaled filtered cost volumes.

Based on the filtered cost volume, a selection may be made at each pixel location to generate selected disparity values. Such selected disparity values may be used as a disparity map or they may be further processed (e.g., post processed) to generate a disparity map. For example, if the discussed techniques were generated using first image data as a reference image and second image data as a target image, post processing may include generating a second disparity map using the second image data as the reference image and the first image data as the target image and comparing the first and second disparity maps. Furthermore, such post processing may including filling any inconsistencies between the first and second disparity maps and/or holes (e.g., locations where disparity values could not be determined), filtering or smoothing such filled pixel locations, or the like.

Such techniques may provide for high quality stereo image correspondence. Herein, techniques related to stereo image correspondence are typically discussed based on two input stereo images. However, such techniques may be applied to any number of input stereo images. Furthermore, the correspondence between stereo images is discussed with respect to a 1-dimensional (e.g., horizontal) matching to determine disparity values (e.g., such that no vertical disparity is determined). Such techniques may be provided in contexts where stereo image calibration and/or rectification have been performed prior to stereo image correspondence. However, the techniques discussed herein may be used to determine both horizontal and vertical matching (e.g., 2-dimensional disparity) between stereo images.

FIG. 1 illustrates an example device 100 for performing stereo image correspondence, arranged in accordance with at least some implementations of the present disclosure. As shown in FIG. 1, device 100 may include a calibration module 101, a rectification module 102, a stereo matching module 103, and an un-rectification module 104. Device 100 may be any suitable form factor device such as a computer, a laptop computer, a tablet, a smart phone, a digital camera, a scanner, a multifunction device, a gaming console, a wearable device, a display device, or the like. For example, device 100 may include multiple (e.g., 2 or 3 or more) cameras (not shown) for capturing 2 or 3 or more stereo images and device 100 may perform stereo image correspondence as discussed herein.

As shown, calibration module 101 may receive stereo image data 110. Stereo image data 110 may include any suitable image or imaging data representing an image scene. In some examples, stereo image data 110 may be received from two or more image sensors, an image signal processor or processors, or the like. In some examples, stereo image data 110 may include data representative of two images of a scene. For example, stereo image data 110 may include first image data representative of a first image of a scene from a first perspective and second image data representative of a second image of a scene from a second perspective. The first and second image data may be characterized as first and second images or views, left and right images or views, reference and target images or views, reference and corresponding images or views, or the like. In other examples, stereo image data 110 may include data representative of three or more images of a scene.

As shown, calibration module 101 may receive stereo image data 110 and calibration module 101 may perform calibration on stereo image data 110. Such calibration may include any suitable calibration technique or techniques such as image scaling, image translation, image rotation, or the like. In some examples, such calibration may be based on data received from other modules of device 100 indicating an orientation or the like of device 100. In some examples, calibration module 101 may be implemented via a stereo camera system or the like of device 100. Calibration module 101 may generate calibrated stereo image data (CSI) 111 and calibration module 101 may transfer calibrated stereo image data 111 to rectification module 102 and/or a memory of device 100 (not shown).

Rectification module 102 may receive calibrated stereo image data 111 and rectification module 102 may generate rectified stereo image data (RSI) 112 based on calibrated stereo image data 111. For example, rectification module 102 may perform rectification on calibrated stereo image data 111 using any suitable technique or techniques to generate rectified stereo image data 112. For example, rectification module 102 may project calibrated stereo image data 111 to a common image plane to generate rectified stereo image data 112. As shown, rectification module 102 may transfer rectified stereo image data 112 to stereo matching module 103 and/or a memory of device 100.

Stereo matching module 103 may receive rectified stereo image data 112 and stereo matching module 103 may generate disparity map data (DM) 113 based on rectified stereo image data 112. For example, stereo matching module 103 may generate disparity map data 113 using any stereo image correspondence techniques discussed herein. For example, stereo matching module 103 may generate a filtered cost volume based on stereo image data 112 such that the costs of the filtered cost volume are based on phase matching in a phase domain. In some examples, the filtered cost volume may be determined based on multiple scaled filtered cost volumes using cross scale volume filtering techniques, as is discussed further herein. Stereo matching module 103 may generate disparity values for pixel locations of stereo image data based on the filtered cost volume using, for example, a winner-takes-all approach or the like. The resultant disparity map may be post-processed (e.g., based on comparison with a second disparity map generated by reversing the reference and target images and/or based on hole filling techniques) to generate disparity map data 113. As shown, stereo matching module 103 may transfer disparity map data 113 to un-rectification module 104 and/or a memory of device 100.

Un-rectification module 104 may receive disparity map data 113 and un-rectification module 104 may generate depth data 120 based on disparity map data 113. Un-rectification module 104 may generate depth data 120 using any suitable technique or techniques such as reversing the projection provided by rectification module 102 and/or providing depth values for pixel locations that provide relative depth information for objects in the scene represented by stereo image data 110. As shown, un-rectification module 104 may provide depth data 120 to another module of device 100, a memory of device 100, or an external device. Depth data 120 may include any suitable data representing depth information associated with stereo image data 110. For example, depth data 120 may include a depth value or channel for pixel locations indicating a depth or distance from a viewpoint, a distance from a camera, a distance from a nominal focus plane, a distance from an image plane, or the like. Device 100 may use depth data 120 for a variety of purposes such as, for example, 3D image construction, object detection, object recognition, computer vision tasks, rendering graphical images to a scene, or the like.

As discussed with respect to FIG. 1, in some examples, stereo image calibration and rectification may be performed prior to stereo matching (e.g., via stereo matching module 103). Such calibration (e.g. via a stereo camera system or the like) and rectification may simplify stereo correspondence as implemented via stereo matching module 103. For example, in such examples, a 1-dimensional (e.g., horizontal) correspondence and disparity value determination may be performed for pixel locations of the stereo images such that pixel locations are associated with a single disparity value or channel representing a disparity in 1-dimension (e.g., the horizontal dimension). In other examples, an unrectified pair (or more) of stereo images may be provided. In such examples, stereo matching 103 may perform 2-dimensional (e.g., horizontal and vertical) correspondence and disparity values determination may be performed for pixel locations of the stereo images such that pixel locations are associated with two disparity values or channels representing a disparity in 2-dimensions (e.g., the horizontal and vertical dimensions).

Figure 2:
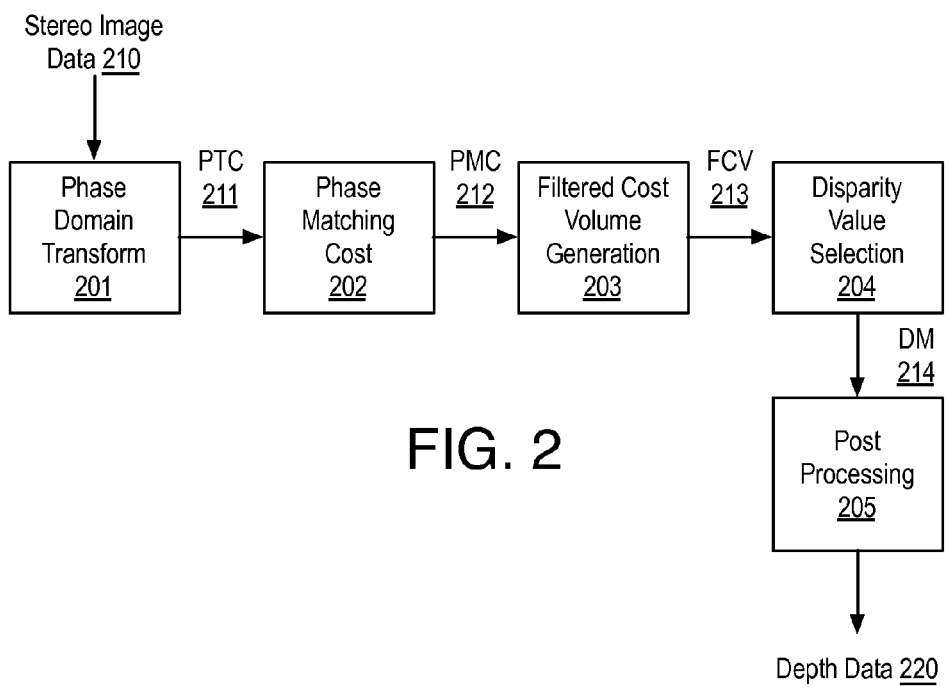
FIG. 2 illustrates an example stereo matching module for performing stereo image correspondence.

FIG. 2 illustrates an example stereo matching module 103 for performing stereo image correspondence, arranged in accordance with at least some implementations of the present disclosure. As shown in FIG. 2, stereo matching module 103 may include a phase domain transform module 201, a phase matching cost module 202, a filtered cost volume generation module 203, a disparity value selection module 204, and a post processing module 205. As shown, phase domain transform module 201 may receive stereo image data 210. Stereo image data 210 may include any suitable image or imaging data representing an image scene. For example, stereo image data 210 may be calibrated and rectified stereo image data or unrectified stereo image data or the like. In some examples, stereo image data 210 may include data representative of two images or viewpoints of a scene. For example, stereo image data 210 may include first image data representative of a first image of a scene from a first perspective and second image data representative of a second image of a scene from a second perspective as discussed herein. In some examples, stereo image data 210 may correspond to rectified stereo image data 112.

As shown, phase domain transform module 201 may receive stereo image data 210 and phase domain transform module 201 may generate phase transform coefficient data (PTC) 211 based on stereo image data 210. For example, phase domain transform module 201 may generate phase transform coefficient data 211 based on performing a phase domain transform on first image data and second image data of stereo image data 210 to generate first transform coefficients associated with the first image data and second transform coefficients associated with the second image data. Phase transform coefficient data 211 may include any suitable data such as transform coefficients for the first image data and transform coefficients for the second image data or the like. Phase transform module 201 may perform the transform from a spatial domain to a phase domain using any suitable technique or techniques. Furthermore, the phase domain may include any suitable phase domain such as a Fourier transform domain, a wavelet transform domain, or the like.

In some examples, the phase domain transform may have a single resolution (e.g., in the Fourier transform domain). However, in other examples, the phase domain transform may be in multi-resolution. For example, a phase transform to the complex wavelet domain may be in multi-resolution. For example, a multi-level dual-tree complex wavelet transform (DT CWT) may provide approximate shift invariance and low redundancy while providing multi-resolution as is discussed further herein. In other examples, a multi-resolution phase domain transform may be provided in the Fourier transform domain based on the construction of a Gaussian pyramid or the like in the Fourier transform domain. As shown, phase domain transform module 201 may transfer phase transform coefficient data 211 to phase matching cost module 202 and/or a memory of device 100.

Phase matching cost module 202 may receive phase transform coefficient data 211 and phase matching cost module 202 may determine phase matching based costs (PMC) 212. For example, phase matching based costs 212 may be include a cost definition (e.g., a similarity metric or the like) based on phase matching in the phase domain of phase transform coefficient data 211. For example, costs may be defined for each pixel location of the first image data of stereo image data 210 and for multiple disparity values with respect to the first image data of stereo image data 210.

Figure 3:
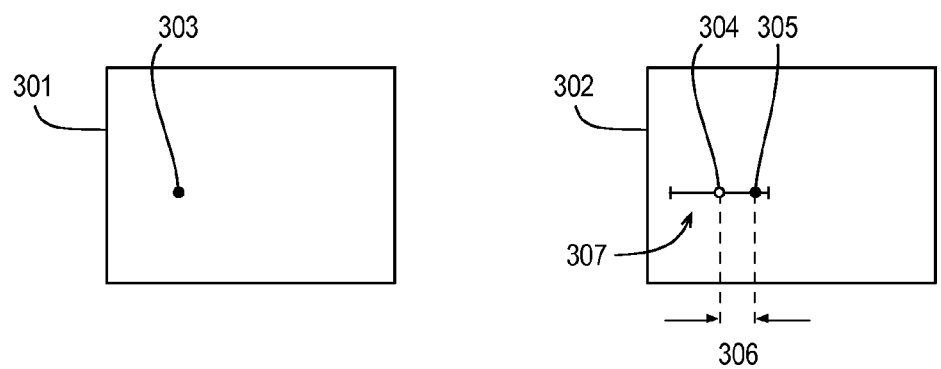
FIG. 3 illustrates example stereo images.

FIG. 3 illustrates example stereo images 300, arranged in accordance with at least some implementations of the present disclosure. As shown in FIG. 3, stereo images 300 may include a first image 301 (e.g., a reference image or a left image) and a second image 302 (e.g., a corresponding image, a target image, or a right image). As discussed, stereo images 300 may be provided via stereo image data 110 or stereo image data 210 or the like such that such stereo image data includes data representative of a first image and a second image and, in some examples, additional stereo images. As shown, first image 301 may include pixel locations (e.g., having pixel values) including an individual pixel location 303. For example, individual pixel location 303 may have a corresponding intensity value or the like. In stereo correspondence, as discussed, the objective may be to find a corresponding pixel location 305 in second image 302 such that individual pixel location 303 and corresponding pixel location 305 are representative of the same object (or location on an object) in the scene represented by first image 301 and second image 302.

Also as shown in FIG. 3, the horizontal difference between individual pixel location projection 304, which corresponds to individual pixel location 303 as projected onto second image 302, and corresponding pixel location 305 may be associated with a disparity value 306. For example, disparity value 306 may be the distance between corresponding pixel location 305 and individual pixel location projection 304 measured in pixels or the like. Disparity value 306 may be provided as a part of a disparity map (e.g., such that disparity values at all or some pixel locations of first image 301 are determined and provided in the disparity map) and/or disparity value 306 may be translated to a depth value as part of the generation of a depth map (e.g., such that depth values at all or some pixel locations of first image 301 are determined and provided in the depth map).

As discussed, FIG. 3 illustrates corresponding pixel location 305 corresponding to individual pixel location 303. Such correspondence information is to be determined using the techniques discussed herein. Furthermore, FIG. 3 illustrates a disparity values range 307 with respect to second image 307. For example, disparity values range 307 may be the range of disparity values evaluated in the search for corresponding pixel location 305 (e.g., pixel locations outside of disparity values range 307 may not be evaluated for correspondence). Disparity values range 307 may include any suitable range such as for example, a range of 64 pixels, a range of 128 pixels, a range of 256 pixels, or the like. As shown in FIG. 3, in a 1-dimensional search, a horizontal disparity values range 307 may be evaluated for correspondence. In 2-dimensional search examples, horizontal and vertical disparity values ranges may be provided.

Returning to FIG. 1, as discussed, phase matching cost module 202 may determine or define phase matching based costs 212 for individual pixels of a first stereo image and associated with disparity values with respect to a second stereo image. For example, phase matching based costs 212 may define a volume of phase matching based costs having a width associated with individual pixels of the first stereo image, a height associated with individual pixels of the first stereo image, and a depth of the number of disparity values being evaluated. For example, a volume of the phase matching based costs may have a size of $V = H \times W \times D$, where V may be the volume, H may be the height of the individual pixels of the first stereo image, W may be the width of the individual pixels of the first stereo image, and D may be the number of disparity values being evaluated. As discussed, individual pixels of a first image may be evaluated using the techniques discussed herein. In some examples, all pixel locations of the first image may be evaluated. In other examples, sample pixel locations of the first image may be evaluated. Furthermore, in some examples, the entirety of the first image (and the second image) may be evaluated at once using the techniques discussed herein and, in other examples, slices or regions or the like of the first image may be evaluated separately.

As discussed, phase matching based costs 212 for individual pixels of a first stereo image and associated with disparity values may be determined or defined via phase matching cost module 202. In some examples, as discussed with respect to phase transform domain module 201, phase matching based costs 212 may be single resolution such that a single resolution volume of phase matching based costs may be determined or defined for the first stereo image. In other examples, phase matching based costs 212 may be in multi-resolution such that multiple volumes of phase matching based costs may be determined or defined for the first stereo image and such that each of the multiple volumes of phase matching based costs have different scales (e.g., increasing scales or resolutions). As shown, phase matching cost module 202 may provide phase matching based costs 212 to filtered cost volume generation module 203 and/or a memory of device 100.

In some examples, phase matching based costs 212 may include cost values associated with pixel locations and a disparity value ranges in single or multi-resolution. In such examples, phase matching based costs 212 may be filtered and/or combined via filtered cost volume generation module 203 to generate a filtered cost volume (e.g., as represented by filtered cost volume data 213). In other examples, phase matching based costs 212 may include coefficients, parameters, data, or the like representative of cost models such that filtered cost volume generation module 203 may provide filtering and cost determination in concert to generate a filtered cost volume (e.g., as represented by filtered cost volume data 213).

As shown, filtered cost volume generation module 203 may receive phase matching based costs 212 and filtered cost volume generation module 203 may generate filtered cost volume data (FCV) 213. Filtered cost volume generation module 203 may generate filtered cost volume data 213 using any suitable technique or techniques. For example, filtered cost volume generation module 203 may apply a filter to phase matching based costs 212 to generate filtered cost volume data 213. The applied filter may include any suitable filter such as a box filter, an anisotropic diffusion filter, a bilateral filter, a guided filter, a non-local filter and segment tree, or the like.

Furthermore, as discussed, in some examples, phase domain transform module 201 and phase matching cost module 202 may generate data in a single resolution. In such examples, filtered cost volume generation module 203 may apply a filter and/or perform additional processing to generate filtered cost volume data 213. In other examples, phase domain transform module 201 and phase matching cost module 202 may generate data in multi-resolution. In such examples, filtered cost volume generation module 203 may apply a filters or filters to costs at different resolutions or scales to generate multiple filtered cost volumes (e.g., each associated with a different resolution or scale) and filtered cost volume generation module 203 may generate filtered cost volume data 213 based on the multiple filtered cost volumes at different scales. For example, generating filtered cost volume data 213 based on the multiple filtered cost volumes may include coarse to fine approaches to reduce the disparity search space, cross scale cost volume filtering to enforce inter-scale consistency (e.g., in moving from coarse to fine scale), or the like. Such techniques are discussed in more detail herein.

Filtered cost volume data 213 may include any suitable data representative of a filtered cost volume associated with stereo image data 210. For example, filtered cost volume data 213 may include a cost (e.g., a phase matching based cost) at each position within a volume having dimensions of the height of a first (or reference) stereo image, a width of the stereo image, and a number of evaluated disparity values associated with a second (or target) stereo image.

Figure 4:
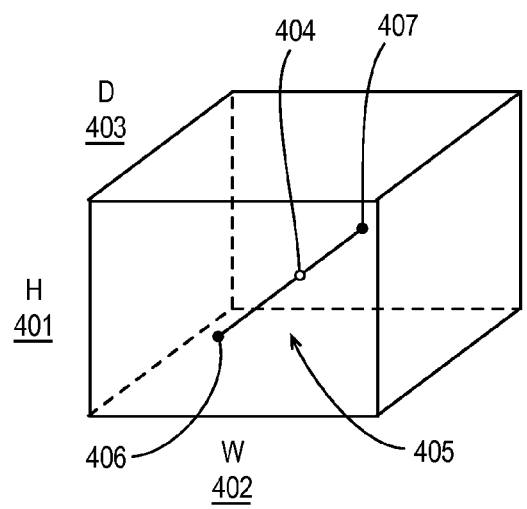
FIG. 4 illustrates an example filtered cost volume.

FIG. 4 illustrates an example filtered cost volume 400, arranged in accordance with at least some implementations of the present disclosure. As shown in FIG. 4, filtered cost volume 400 may include a volume of cost values such as individual cost value 404. For example, filtered cost volume 400 may have a height (H) 401, a width (W) 402, and a depth (D) 403, where height 401 is the height (in pixels) of the first (or reference) image or image slice being evaluated, where width 402 is the width (in pixels) of the first (or reference) image or image slice being evaluated, and depth 403 is the number of disparity values being evaluated (e.g., the disparity value range being evaluated and associated with the second or target image). As discussed, filtered cost volume 400 may have a volume or number of values, V, of H×W×D.

Furthermore, individual cost value 404 may be associated with a pixel position, $(x_i, y_i)$, within the first image and a disparity value, $d_j$. For example, disparity value $d_j$ may lie along a range of disparity values 405 being evaluated via phase based costs as discussed herein. As shown in FIG. 4, range of disparity values 405 may extend from individual cost value 406 to individual cost value 407 such that each cost value along range of disparity values 405 is associated with pixel position $(x_i, y_i)$ and such that range of disparity values 405 extends from a minimum disparity value (e.g., associated with a furthest move left, please refer to FIG. 3) at individual cost value 406 to a maximum disparity value (e.g., associated with a furthest move right, please refer to FIG. 3) at individual cost value 407.

As shown with respect to FIG. 4, filtered cost volume data 213 may be associated with filtered cost volume 400 having a highest resolution or finest scale. As discussed, in some examples, filtered cost volume 400 may be generated based on filtering single resolution filtered cost volume data at the highest resolution or finest scale and, in other examples, filtered cost volume 400 may be generated based on multi-resolution filtered cost data such filtered cost volume data at the highest resolution or finest scale are based at least in part on lower resolution or coarser scale filtered cost volume data.

Returning to FIG. 2, disparity value selection module 204 may receive filtered cost volume data 213 and disparity value selection module 204 may generate disparity map data (DM) 214 based on filtered cost volume data 213. Disparity value selection module 204 may generate disparity map data 214 using any suitable technique or techniques. For example, disparity value selection module 204 may select a disparity value for each pixel location of the first image based on filtered cost volume data 213. In some examples, disparity value selection module 204 may select a disparity value for each pixel location based on a winner-takes-all (WTA) technique such that the disparity value associated with the lowest cost at the individual pixel location is used to generate disparity map data 214. For example, with reference to FIG. 4, individual cost value 404 associated with pixel position $(x_i, y_i)$ and disparity value $d_j$ may be a minimum cost along range of disparity values 405. In such examples, disparity value $d_j$ may be selected for pixel position $(x_i, y_i)$ and included in disparity map data 214. Using such techniques, disparity value selection module 204 may provide a disparity value for each individual pixel value of the first image of stereo image data 210. As shown, disparity value selection module 204 may provide disparity map data 214 to post processing module 205 and/or a memory of device 100.

Post processing module 205 may receive disparity map data 214 and post processing module 205 may generate depth data 220. Post processing module 205 may perform any suitable post processing such as, for example, checking left/right consistency (e.g., generating a second disparity map with the second image as the reference image and the first image as the target image). For example, second disparity map data may be generated by switching the first and second image data and repeating the processing as discussed with respect to phase matching cost module 202, filtered cost volume generation module 203, and disparity value selection module 204 (e.g., the processing discussed with respect to phase domain transform may not need to be repeated as phase transform coefficient data 211 may be reused with the reference and target being reversed). Based on the two disparity maps post processing module 205 may tag inconsistent pixel locations as those having disparity differences of greater than one pixel or the like. Such consistency checks may fail for mismatches or occlusions or the like. Furthermore, post processing module 205 may fill such inconsistent pixels based on disparity values of the closest neighboring consistent (e.g., valid) pixels. In some examples, post processing module 205 may apply a weighted median filter or the like to such filled pixels to reduce streak-like artifacts or other artifacts and to smooth the regions of such filled pixels.

As shown, post processing module 205 may provide depth data 220 for use by other modules of device 100. For example, depth data 220 may be provided to un-rectification module 104 or any other module of device 100 for use in image processing contexts. Depth data 220 may include any suitable data such as disparity values or depth values or the like for pixel locations associated with stereo image data 210. For example, translation between disparity values and depth values may be performed based on characteristics used to attain of the first and second images (e.g., camera positions or the like).

Stereo matching module 103 may provide for accurate image correspondence results. For example, phase matching, in a Fourier or a wavelet domain or the like, may provide accurate matching or correspondence as the matching primitive and the phase itself reflect the structure information of the stereo image signals and therefore may have an inhibited effect on the high-frequency noise of images. Furthermore, the discussed cost aggregation (e.g., generation of a filtered cost volume) may provide smoothing of the stereo cost volume. In such contexts, shape preserving filters such as the filters discussed herein may provide high quality results in local filtering. By applying shape preserving filters in cost volumes based on phase matching in the Fourier transform domain or wavelet transform domain or the like, the discussed techniques may provide improved stereo correspondence and disparity map results.

Figure 5:
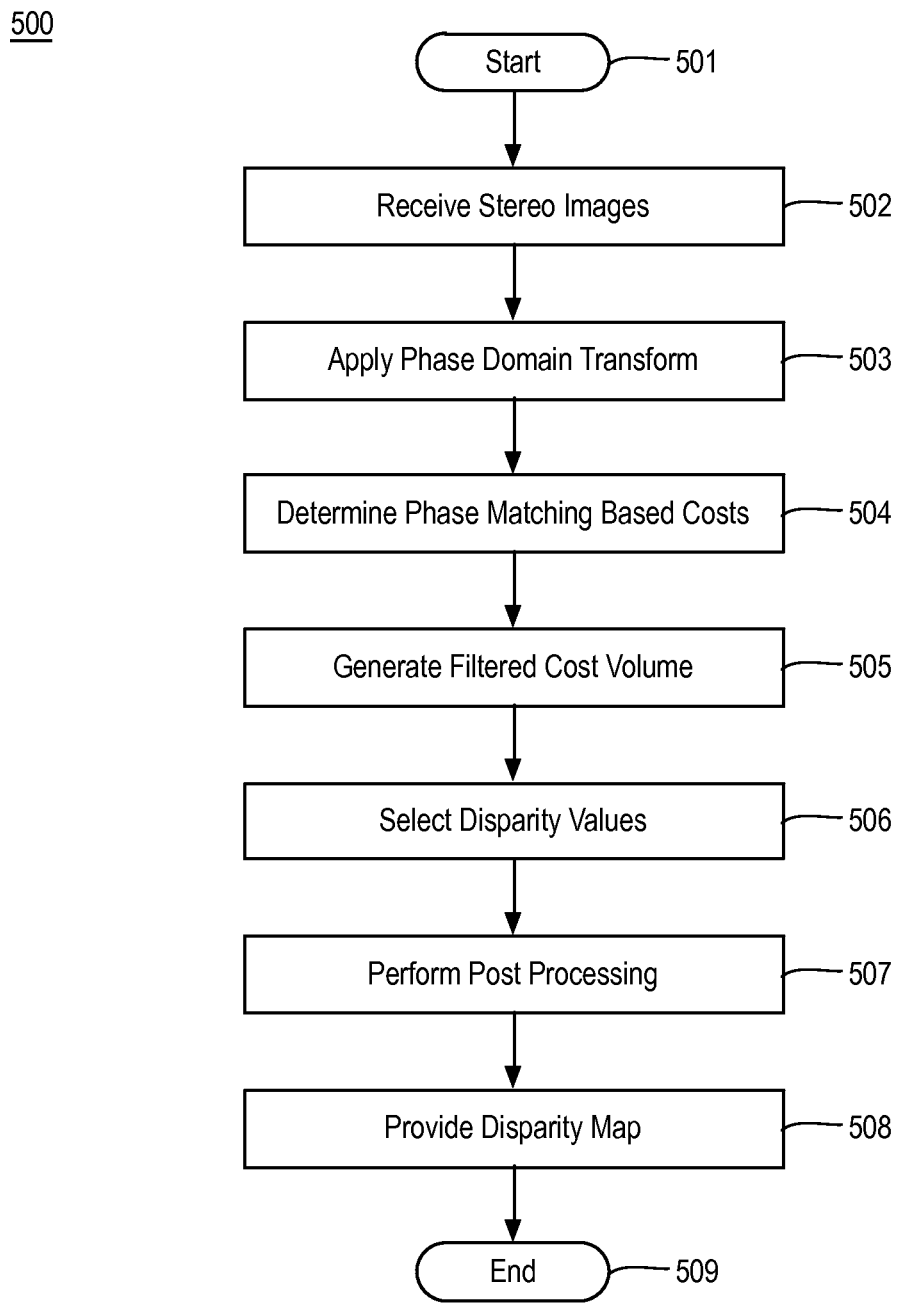
FIG. 5 illustrates an example process for performing stereo image correspondence.

FIG. 5 illustrates an example process 500 for performing stereo image correspondence, arranged in accordance with at least some implementations of the present disclosure. Process 500 may include one or more operations 501-509 as illustrated in FIG. 5. Process 500 may be performed by a device (e.g., device 100 or any other devices or systems discussed herein) or portions of process 500 may be performed by a device to perform stereo image correspondence. Process 500 or portions thereof may be repeated for any number stereo images, stereo image slices, or the like. Furthermore, process 500 may provide for stereo image correspondence based on a single resolution or scale transform and/or a single scale filtered cost volume.

As shown, process 500 may begin from start operation 501 at operation 502, "Receive Stereo Images", where two or more stereo images may be received. Such stereo images may include any image data as discussed herein representative of stereo image pairs or stereo image groupings or the like.

Processing may continue at operation 503, "Apply Phase Domain Transform", where a phase domain transform (e.g., a transform to a phase domain) such as a single resolution phase domain transform may be applied or performed. In some examples, the phase transform domain may include a Fourier transform domain or the like. The transform may be performed using any suitable technique or techniques to generate first phase transform coefficients associated with first image data (e.g., associated with a reference image) and second phase transform coefficients associated with second image data (e.g., associated with a corresponding image). Although discussed herein with respect to two stereo images being evaluated for 1-dimensional correspondence, the described techniques may be applied to any number of stereo image and may include 1-dimensional or 2-dimensional correspondence.

Processing may continue at operation 504, "Determine Phase Matching Based Costs", where phase matching based costs may be determined. For example, phase matching between a pair of stereo images may be defined based on a phase difference in the phase domain. For example, a phase matching based cost may be a phase difference determined for a pixel location in the reference image based on a disparity value and a search window. In some examples, the phase difference may be a difference between a phase of the left or reference image at the pixel location and over a search window and a phase of the right or target image at the pixel location offset by a disparity value and over a search window of the same size. As discussed, such phase matching based costs may be determined or defined for individual pixel locations of the left or reference image and for a range of disparity values to define a cost volume.

As discussed, a phase matching cost may be determined for pixel locations of the reference image and associated with a range of disparity values. The phase matching cost may include a phase difference between the left or reference image and the right or target image, for example. In some examples, the phase matching cost may be defined as a phase difference. In some examples, the phase difference may be determined as shown in Equation (1):

$$\text{delta}\phi(x_l, y, d, m, n) = \lfloor \phi_l(x_l+m, y+n) - \phi_r(x_l+d+m, y+n) \rfloor_{2\pi} \quad (1)$$

where $\text{delta}\phi$ may be the phase difference, $x_l$ and y may be the pixel location, d may be the disparity value, and m and n may be the dimensions of a search window for phase matching. As discussed, by determining costs at a range of disparity values, a cost volume may be defined for the stereo images. For example, minimizing the phase difference between left or reference image patches and right or target image patches may determine disparity values for the left or reference image.

Processing may continue at operation 505, "Generate Filtered Cost Volume", where a filtered cost volume may be generated based on the phase matching based costs. The filtered cost volume may be generated using any suitable technique or techniques such as by applying a filter to the phase matching based costs determined at operation 504. The filter may be any suitable filter such as a box filter, an anisotropic diffusion filter, a bilateral filter, a guided filter, a non-local filter and segment tree, or the like. For example, filtered cost volume 400 may be generated at operation 505. As discussed, in some examples, a single filtered cost volume may be generated based on single resolution based phase transforms and phase matching based costs. As discussed with respect to operation 504, a cost value may be determined or defined based on the phase difference of a pixel of the left or reference image and a pixel of the right or target image. A weighted least square (WLS) optimization based on such cost values may provide various shape preserving cost volume filtering methods such as box filters, anisotropic diffusion filters, bilateral filters, guided filters, non-local filters and segment trees, or the like.

For example, a filtered cost volume may be defined as provided in Equations (2) and (3):

$$\tilde{C}(i, l) = \underset{z}{\text{argmin}} \frac{1}{Z_i} \sum_{j \in N_i} K(i, j) \| z - C(j, l) \|^2 \quad (2)$$

$$Z_i = \sum_{j \in N_i} K(i, j) \quad (3)$$

where $\tilde{C}$ may be the cost volume, K may be the filter kernel measuring the similarity of pixel i and pixel j, $N_i$ may be the neighboring system of pixel i, and $Z_i$ may be a normalization constant as shown in Equation (3), and C may be the phase matching based cost. In some examples, tree based aggregation may define $N_i$ as the whole image.

Furthermore, a solution to the WLS problem may be provided as shown in Equation (4):

$$\tilde{C}(i, l) = \frac{1}{Z_i} \sum_{j \in N_i} K(i, j) C(i, j) \quad (4)$$

For example, the filtered cost volume may be determined based on Equation (4) such that the phase matching based cost is provided as discussed herein with respect to Equation (1).

Processing may continue at operation 506, "Select Disparity Values", where disparity values may be selected based on the filtered cost volume. The disparity values may be selected using any suitable technique or techniques based on the filtered cost volume determined at operation 505. For example, the disparity values may be selected based on a winner-takes-all technique implemented at each pixel location such that a disparity value associated with a minimum cost is selected for each pixel location as discussed herein.

Processing may continue at operation 507, "Perform Post Processing", where post processing may be performed. For example, post processing may include checking left/right consistency, tagging inconsistent pixels based on checking the left/right consistency, filling inconsistent pixels, and applying a filter to smooth the filled pixels as discussed herein with respect to post processing module 205.

Processing may continue at operation 508, "Provide Disparity Map", where the generated disparity map or an associated depth map or the like may be provided, and processing may end at end operation 509. The generated disparity map or an associated depth map or the like may be provided for use via a local device (e.g., a device used to implement process 500) or the generated disparity map or associated depth map or the like may be provided to a remote device. The generated disparity map or associated depth map or the like may be used for any suitable image processing such as 3D image construction, object detection, object recognition, computer vision tasks, rendering graphical images to a scene, or the like.

As discussed, process 500 may provide for stereo image correspondence using single resolution. Process 500 may be repeated any number of times either in series or in parallel for any number of stereo images or slices of stereo images or the like. As discussed, process 500 may provide for a high quality disparity or depth map. For example, performing stereo correspondence based on a filtered cost volume such that the costs are based on phase matching may provide for high quality disparity or depth maps.

Figure 6:
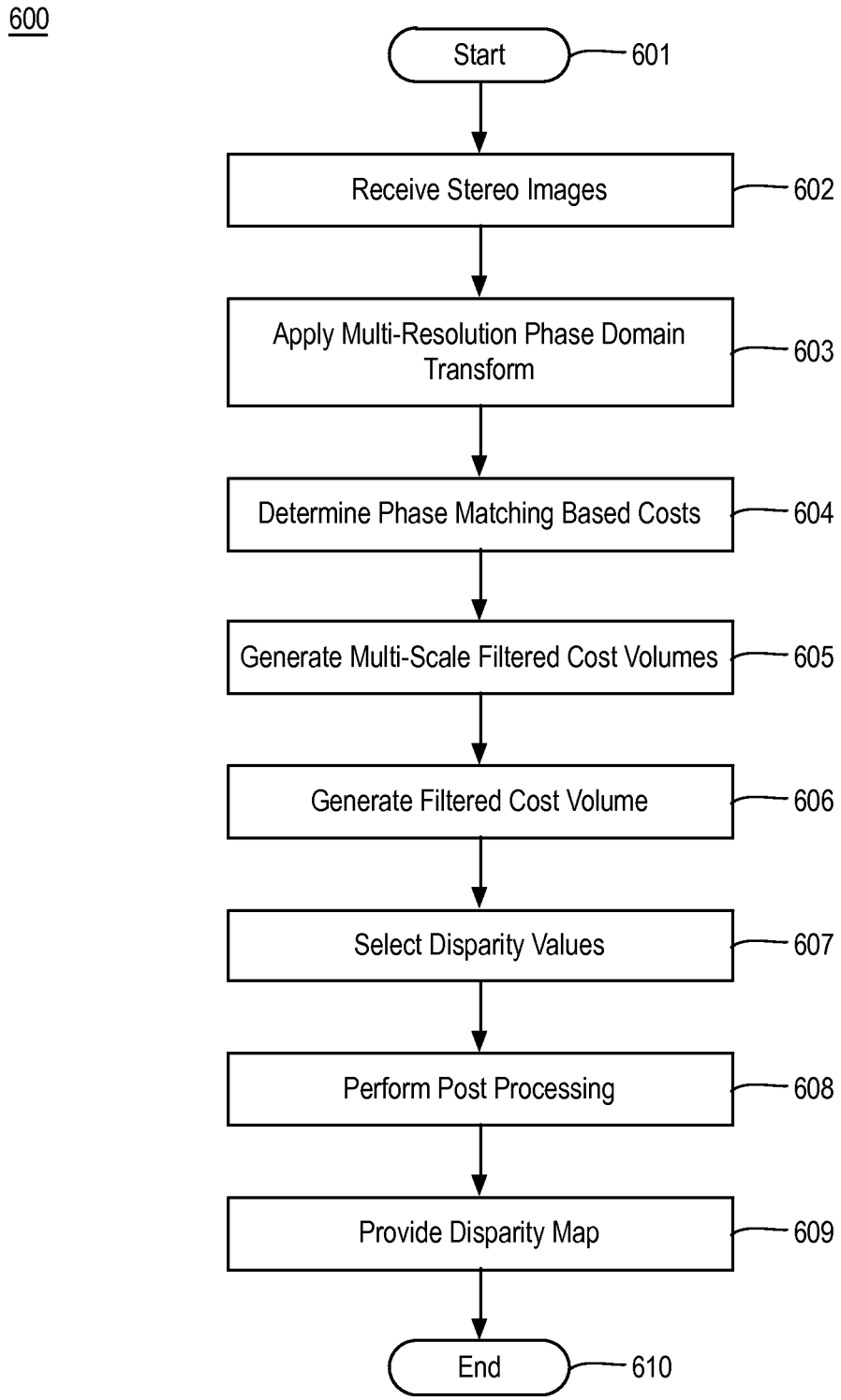
FIG. 6 illustrates an example process for performing stereo image correspondence.

FIG. 6 illustrates an example process 600 for performing stereo image correspondence, arranged in accordance with at least some implementations of the present disclosure. Process 600 may include one or more operations 601-610 as illustrated in FIG. 6. Process 600 may be performed by a device (e.g., device 100 or any other devices or systems discussed herein) or portions of process 600 may be performed by a device to perform stereo image correspondence. Process 600 or portions thereof may be repeated for any number stereo images, stereo image slices, or the like. Furthermore, process 600 may provide for stereo image correspondence based on a multi-resolution or multi-scale transform and/or a multi-scale filtered cost volume.

As shown, process 600 may begin from start operation 601 at operation 602, "Receive Stereo Images", where two or more stereo images may be received. Such stereo images may include any image data as discussed herein representative of stereo image pairs or groupings or the like.

Processing may continue at operation 603, "Apply Multi-Resolution Phase Domain Transform", where a multi-resolution phase domain transform (e.g., a transform to a phase domain that provides multiple resolution) may be applied or performed. In some examples, the phase transform domain may include a wavelet transform domain or the like. In other examples, the phase transform domain may include a Fourier transform domain constructed based on a Gaussian pyramid or the like. The transform may be performed using any suitable technique or techniques to generate first phase transform coefficients associated with first image data (e.g., associated with a reference image) and second phase transform coefficients associated with second image data (e.g., associated with a corresponding image). For example, the first and second phase transform coefficients may include coefficients at multiple resolutions or scales. Although discussed herein with respect to two stereo images being evaluated for 1-dimensional correspondence, the described techniques may be applied to any number of stereo image and may include 1-dimensional or 2-dimensional correspondence. In some examples, the phase domain transform may include a dual-tree complex wavelet transform (DT CWT), which may provide approximate shift invariance and low redundancy. Although discussed herein with respect to a DT CWT, a multiple scale domain space may be constructed in any suitable phase domain such as a Fourier transform domain based on a Gaussian pyramid construction or the like.

Figure 7:
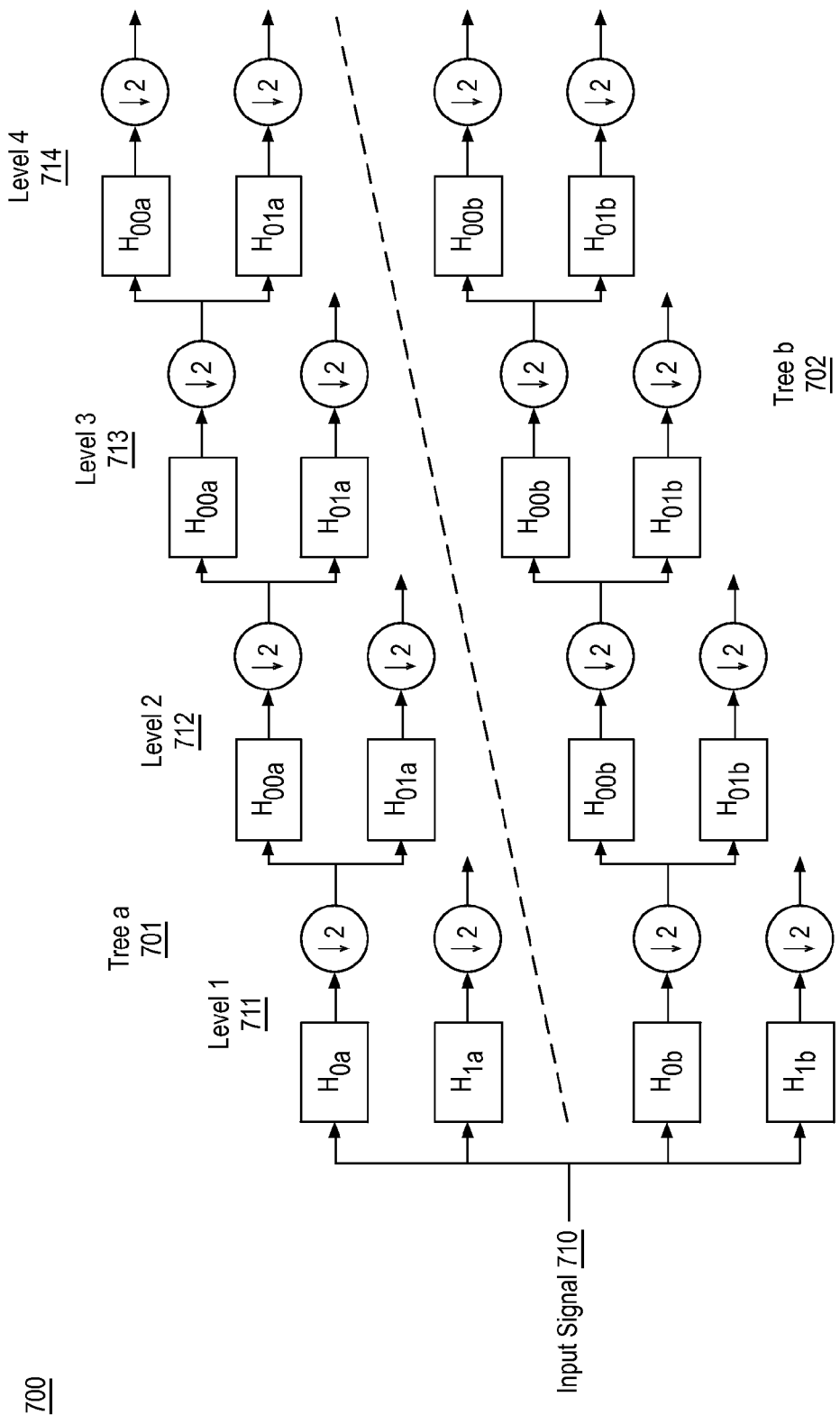
FIG. 7 illustrates an example dual-tree complex wavelet transform structure.

FIG. 7 illustrates an example dual-tree complex wavelet transform structure 700, arranged in accordance with at least some implementations of the present disclosure. For example, dual-tree complex wavelet transform structure 700 may provide a Q-shift version of a DT CWT that provides real and imaginary parts of complex coefficients for dual trees (e.g., tree a 701 may provide real parts and tree b 702 may provide imaginary parts). For example, dual-tree complex wavelet transform structure 700 may apply a sample period, q, of 1/4. As shown in FIG. 7, tree a 701 and tree b 702 may include four levels: level 1 711, level 2 712, level 3 713, and level 4 714. Although illustrated with four levels, dual-tree complex wavelet transform structure 700 may include any number of levels. As shown, dual-tree complex wavelet transform structure 700 may receive an input signal 710 such as a 1-dimensional input signal and dual-tree complex wavelet transform structure 700 may provide analytic wavelet coefficients and local phase in multi-resolution. For example, tree a 701 and tree b 702 may provide separate decompositions to determine the complex transform of input signal 710 based on implementing high pass filters (e.g., $H_{0a}$, $H_{00a}$, $H_{1a}$, $H_{01a}$), low pass filters (e.g., $H_{0b}$, $H_{00b}$, $H_{1b}$, $H_{01b}$), and decimations (e.g., ↓2) to provide analytic wavelet coefficients and local phase in multi-resolution.

Processing may continue at operation 604, "Determine Phase Matching Based Costs", where phase matching based costs may be determined. For example, phase matching between a pair of stereo images may be defined based on a phase difference. Furthermore, in multi-resolution, phase matching may be performed in a coarse to fine manner starting at the coarsest level, 0, and such that matching results of a level, s−1, may guide the matching process at the subsequent level s. For example, 0 may be the coarsest resolution, level, or scale, s may be any resolution, level, or scale, and S may be the finest resolution, level, or scale. When the process reaches the bottom level (e.g., the finest level), S, a full dense disparity map may be determined. In some examples, for phase matching, the disparity may be uniquely determined only when an effective maximum disparity value does not exceed a filter half-wavelength and the coarse to fine matching patter may efficiently extend a disparity search span to improve matching performance.

For example, phase matching between a stereo pair of images may be based on a phase difference in a phase transform domain as discussed herein. In some examples, a phase matching cost may be based on a phase difference determined based on outputs of the DT CWT for the left and right images. For example, outputs of the DT CWT for the left and right images may be defined as shown in Equations (5) and (6):

$$O_l(x) = \rho_l(x) e^{i\phi_l(x)} \qquad (5)$$

$$O_r(x) = \rho_r(x) e^{i\phi_r(x)} \qquad (6)$$

where O may be the outputs, l may represent the left or reference image, r may represent the right or target image, x may be the input image signal, ρ may be amplitude in the transform domain, and φ may be phase in the transform domain.

As discussed, a phase matching cost may be determined for pixel locations of the reference image and associated with a range of disparity values. The phase matching cost may include a phase difference between the left or reference image and the right or target image, for example. In some examples, the phase matching cost may be defined as a phase difference. In some examples, the phase difference may be determined as shown in Equation (1), where the phase difference delta$\phi$ may be provided based on the wavelet transform domain phase and may be in multi-resolution. As discussed, by determining costs at a range of disparity values, a cost volume may be defined for the stereo images. For example, such a cost volume may be filtered at multiple scales, the multiple scaled cost volumes may be used to generate a (final) filtered cost volume, and minimum values of the (final) filtered cost volume may be determined to generate a disparity map as discussed herein. For example, minimizing phase difference between left or reference image patches and right or target image patches may determine disparity values for the left or reference image.

Processing may continue at operation 605, "Generate Multi-Scale Filtered Cost Volumes", where multi-scale filtered cost volumes (e.g., multiple filtered cost volumes at different scales) may be generated. For example, generating multi-scale filtered cost volumes may provide for adequate support regions to aggregate costs. In some examples, filtering or smoothing the discussed cost volume may provide an implicit segmentation or adaptation window the discussed cost volumes. Furthermore, as discussed, the techniques herein may combine cost volume filtering and phase matching based costs in the Fourier or wavelet domain, which may implicitly provide smoothness constraints in cost aggregations. For example, the discussed DT CWT may provide a multiple scale space. In other examples, a Fourier transform domain may be used to generate a multiple scale space based on Gaussian pyramid construction or the like.

As discussed, a cost value (e.g., a phase matching based cost value) may be defined based on the phase difference of a pixel of the left or reference image and a pixel of the right or target image. Also as discussed, a weighted least square (WLS) optimization may provide various shape preserving cost volume filtering methods such as box filters, anisotropic diffusion filters, bilateral filters, guided filters, non-local filters and segment trees, or the like. For example, multiple scaled filtered cost volumes may be generated based on the phase matching based costs. The filtered cost volumes may be generated using any suitable technique or techniques such as by applying a filter to the phase matching based costs determined at operation 604. The filter may be any suitable filter such as a box filter, an anisotropic diffusion filter, a bilateral filter, a guided filter, a non-local filter and segment tree, or the like. In some example, the filter applied at each scale may be the same and, in other examples, they may be different.

For example, a wavelet transform may build a multiple scale space for phase matching or, for the Fourier transform domain, a Gaussian pyramid or Laplacian pyramid may be built for a hierarchical phase matching framework. In the following, the wavelet domain is used for exemplary purposes. For example, multi-scale cost volumes may be determined based on complex wavelet coefficient phase information at different levels, resolutions, or scales. For example, the cost volume function of Equation (2) may be modified as shown in Equations (7), (8), and (9):

$$\tilde{v} = \operatorname*{argmin}_{\{Z^s\}_{s=0}^S} \left( \sum_{s=0}^{S} \frac{1}{Z_{i^s}^s} \sum_{j^s \in N_{i^s}} K(i^s, j^s) \| z^s - C^s(i^s, j^s) \|^2 \right) \quad (7)$$

$$Z_{i^s}^s = \sum_{j^s \in N_{i^s}} K(i^s, j^s) \quad (8)$$

$$\tilde{v} = [\tilde{C}^0(i^0, l^0), \tilde{C}^1(i^1, l^1), \ldots, \tilde{C}^S(i^S, l^S)]^T \quad (9)$$

where $\tilde{v}$ may be the cost volumes satisfying Equation (9), s may be any scale, S may be the highest scale or resolution, K may be the filter kernel measuring the similarity of pixel i and pixel j at scale s, N may be the neighboring system of pixel i at scale s, and Z may be a normalization constant as shown in Equation (8).

Processing may continue at operation 606, "Generate Filtered Cost Volume", where a filtered cost volume may be generated based on the multi-scale filtered cost volumes. The filtered cost volume may be generated using any suitable technique or techniques such as by applying a coarse to fine technique to the multi-scale filtered cost volumes. In some examples, the filtered cost volume may be generated based on applying cross scale volume filtering to the multi-scale filtered cost volumes. For example, such cross scale volume filtering may implement an inter-scale regularizer to enforce consistency between scales (e.g., the inter-scale regularizer may provide a penalty for inconsistency between scales). For example, cross scale volume filtering may be applied to the multi-scale filtered cost volumes determined at operation 605. For example, a filtered cost volume analogous to filtered cost volume 400 may be generated at operation 606 based on the multi-scale filtered cost volumes generated at operation 605.

Figure 8:
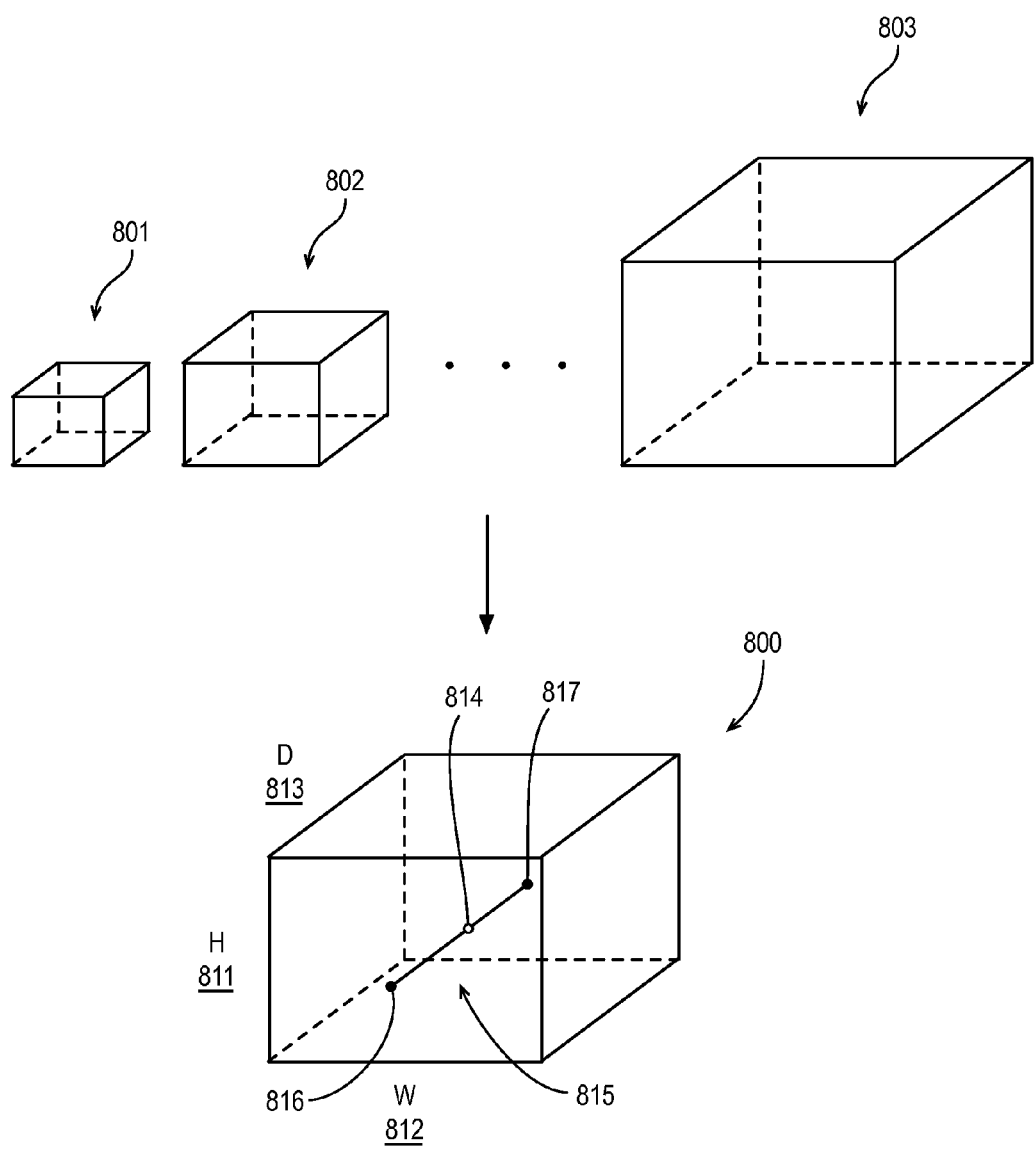
FIG. 8 illustrates an example filtered cost volume generated based on example multi-scaled filtered cost volumes.

FIG. 8 illustrates an example filtered cost volume 800 generated based on example multi-scaled filtered cost volumes 801-803, arranged in accordance with at least some implementations of the present disclosure. As shown in FIG. 8, filtered cost volume 800 may include a volume of cost values such as individual cost value 804. For example, filtered cost volume 800 may have a height (H) 811, a width (W) 812, and a depth (D) 813, where height 811 is the height (in pixels) of the first (or reference) image or image slice being evaluated, where width 812 is the width (in pixels) of the first (or reference) image or image slice being evaluated, and depth 813 is the number of disparity values being evaluated (e.g., the disparity value range being evaluated and associated with the second or target image). Furthermore, individual cost value 814 may be associated with a pixel position, $(x_i, y_i)$, within the first image and a disparity value, $d_j$. For example, disparity value $d_j$ may lie along a range of disparity values 815 being evaluated via phase based costs as discussed herein. As shown in FIG. 8, range of disparity values 815 may extend from individual cost value 816 to individual cost value 817 such that each cost value along range of disparity values 815 is associated with pixel position $(x_i, y_i)$ and such that range of disparity values 815 extends from a minimum disparity value at individual cost value 816 to a maximum disparity value at individual cost value 817. For example, filtered cost volume 800 may have a resolution matching the input stereo images.

Also as shown in FIG. 8, filtered cost volume 800 may be generated based on multi-scaled filtered cost volumes 801-803. For example, multi-scaled filtered cost volume 801 may have a lowest resolution, multi-scaled filtered cost volume 802 may have a higher resolution, and multi-scaled filtered cost volume 803 may have a resolution matching that of filtered cost volume 800. Although illustrated with three multi-scaled filtered cost volumes 801-803, any number of multi-scaled filtered cost volumes such as four or more multi-scaled filtered cost volumes may be implemented.

Returning to operation 606 of FIG. 6, as discussed, the filtered cost volume may be generated based on the multi-scale filtered cost volumes using any suitable technique or techniques. In some examples, the filtered cost volume may be generated based on the multi-scale filtered cost volumes using a coarse to fine (CTF) approach that may reduce the disparity value search space at the current scale by using a disparity map estimated from the cost volume at the coarser scale.

In other examples, the filtered cost volume may be generated based on the multi-scale filtered cost volumes using a cross scale cost volume filtering technique. For example, a cross scale cost volume filtering technique may force inter scale consistency on the cost volume by implementing a regularizer. For example, a cross scale cost volume filtering technique may be applied as shown in Equations (10) and (11):

$$\tilde{v} = \underset{\{Z^s\}_{s=0}^S}{\operatorname{argmin}} \left( \sum_{s=0}^S \frac{1}{Z_{i^s}^s} \sum_{j^s \in N_{i^s}} K(i^s, j^s) \|z^s - C^s(i^s, j^s)\|^2 + \lambda R \right) \quad (10)$$

$$R = \|z^s - z^{s-1}\|^2 \quad (11)$$

where $\tilde{v}$ may be the cost volumes defined in equation (9), R as shown in Equation (11) may be the regularizer, and $\lambda$ may be a parameter to control the strength of regularization.

Processing may continue at operation 607, "Select Disparity Values", where disparity values may be selected based on the filtered cost volume. The disparity values may be selected using any suitable technique or techniques based on the filtered cost volume determined at operation 606. For example, the disparity values may be selected based on a winner-takes-all technique implemented at each pixel location such that a disparity value associated with a minimum cost is selected for each pixel location as discussed herein.

Processing may continue at operation 608, "Perform Post Processing", where post processing may be performed. For example, post processing may include checking left/right consistency, tagging inconsistent pixels based on checking the left/right consistency, filling inconsistent pixels, and applying a filter to smooth the filled pixels as discussed herein with respect to post processing module 205.

Processing may continue at operation 609, "Provide Disparity Map", where the generated disparity map or an associated depth map or the like may be provided, and processing may end at end operation 610. The generated disparity map or an associated depth map or the like may be provided for use via a local device or a remote device as discussed with respect to operation 508.

As discussed, process 600 may provide for stereo image correspondence in multi-resolution. Process 600 may be repeated any number of times either in series or in parallel for any number of stereo images or slices of stereo images or the like. As discussed, process 600 may provide for a high quality disparity or depth map. For example, performing stereo correspondence based on a filtered cost volume such that the costs are based on phase matching may provide for high quality disparity or depth maps.

Figure 9:
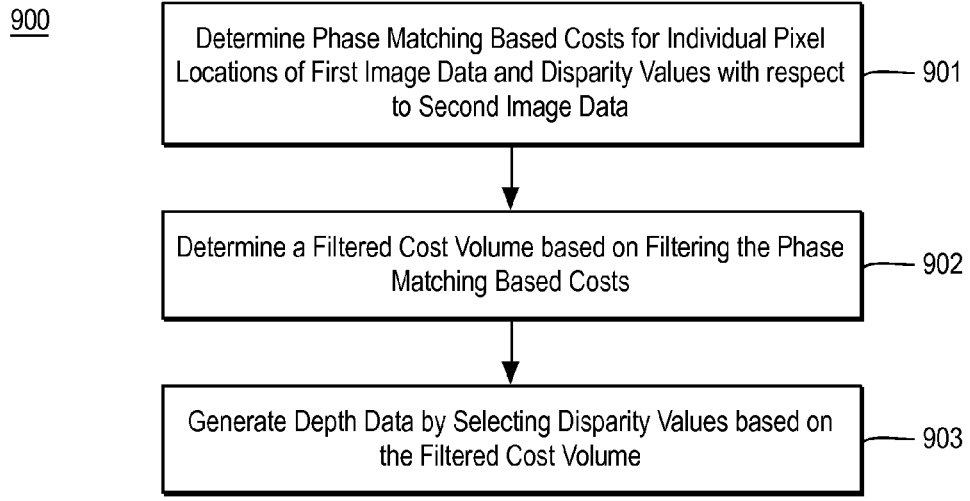
FIG. 9 is a flow diagram illustrating an example process for performing stereo image correspondence.

FIG. 9 is a flow diagram illustrating an example process 900 for performing stereo image correspondence, arranged in accordance with at least some implementations of the present disclosure. Process 900 may include one or more operations 901-903 as illustrated in FIG. 9. Process 900 may form at least part of a stereo image correspondence process. By way of non-limiting example, process 900 may form at least part of a stereo image correspondence process as performed by device 100 as discussed herein. Furthermore, process 900 will be described herein with reference to system 1000 of FIG. 10.

Figure 10:
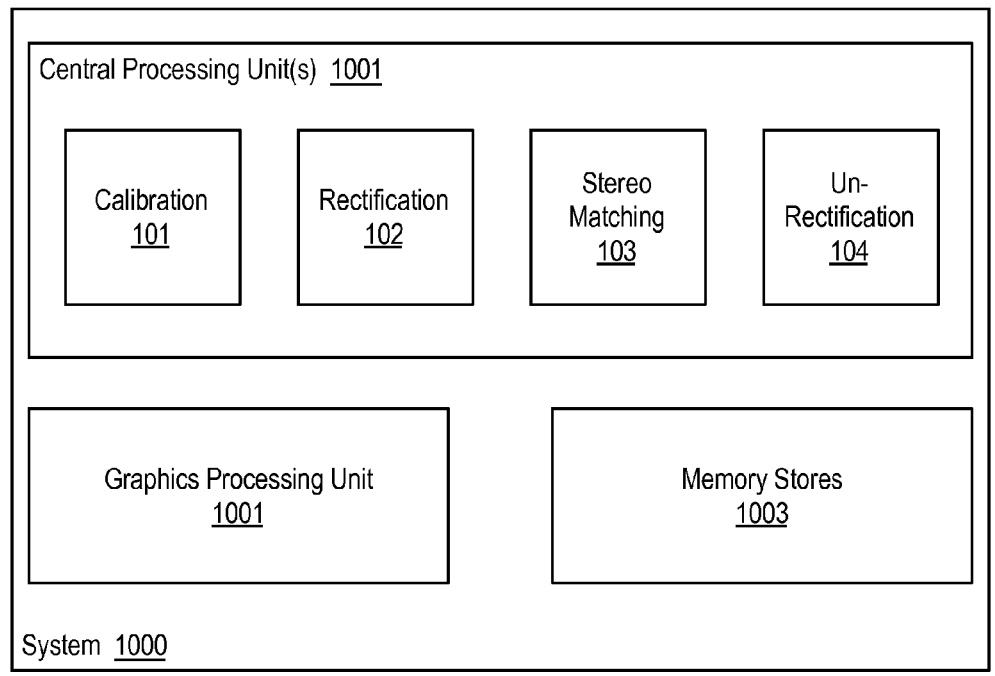
FIG. 10 is an illustrative diagram of an example system for performing stereo image correspondence.

FIG. 10 is an illustrative diagram of an example system 1000 for performing stereo image correspondence, arranged in accordance with at least some implementations of the present disclosure. As shown in FIG. 10, system 1000 may include one or more central processing units (CPU) 1001, a graphics processing unit (GPU) 1002, and memory stores 1003. Also as shown, CPU 1001 may include calibration module 101, rectification module 102, stereo matching module 103, and un-rectification module 104. Furthermore, stereo matching module 103 may include phase domain transform module 201, phase matching cost module 202, filtered cost volume generation module 203, disparity value selection module 204, and post processing module 205. In the example of system 1000, memory stores 1003 may store stereo image data or related content such as input stereo images, stereo image data, phase domain coefficients, calibrated stereo image data, rectified stereo image data, disparity map data, depth data, phase transform coefficient data, phase matching based costs, filtered cost volume data, scaling data, filter data, or the like.

As shown, in some examples, calibration module 101, rectification module 102, stereo matching module 103, and un-rectification module 104 may be implemented via central processing units 1001. In other examples, one or more or portions of calibration module 101, rectification module 102, stereo matching module 103, and un-rectification module 104 may be implemented via graphics processing unit 1002, an image processing unit, an image processing pipeline, or the like.

Graphics processing unit 1002 may include any number and type of graphics processing units that may provide the operations as discussed herein. Such operations may be implemented via software or hardware or a combination thereof. For example, graphics processing unit 1002 may include circuitry dedicated to manipulate images obtained from memory stores 1003. Central processing units 1001 may include any number and type of processing units or modules that may provide control and other high level functions for system 1000 and/or provide any operations as discussed herein. Memory stores 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1003 may be implemented by cache memory. In an embodiment, one or more or portions of calibration module 101, rectification module 102, stereo matching module 103, and un-rectification module 104 may be implemented via an execution unit (EU) of graphics processing unit 1002. The EU may include, for example, programmable logic or circuitry such as a logic core or cores that may provide a wide array of programmable logic functions. In an embodiment, one or more or portions of calibration module 101, rectification module 102, stereo matching module 103, and un-rectification module 104 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 may begin at operation 901, "Determine Phase Matching Based Costs for Individual Pixel Locations of First Image Data and Disparity Values with respect to Second Image Data", where a plurality of phase matching based costs associated with individual pixel locations of first image data and disparity values with respect to second image data may be determined. For example, stereo matching module 103 as implemented via central processing units 1001 may determine the phase matching based costs.

For example, prior to operation 901, a transform may be performed on the first image data and the second image data to generate first phase transform coefficients and second phase transform coefficients in a phase domain. Furthermore, the plurality of phase matching based costs may include phase difference values based at least in part on the first phase transform coefficients and the second phase transform coefficients. In some examples, the phase domain may include at least one of a Fourier transform domain or a wavelet transform domain. Furthermore, in some examples, the first and second phase transform coefficients may be in multi-resolution and the plurality of phase matching based costs may include phase matching based costs at multiple scales associated with the multi-resolution. In such examples, determining the filtered cost volume as discussed with respect to operation 902 may include generating multiple scaled filtered cost volumes and determining the filtered cost volume based on the multiple scaled filtered cost volumes.

Processing may continue at operation 902, "Determine a Filtered Cost Volume based on Filtering the Phase Matching Based Costs", where a filtered cost volume may be determined based at least in part on filtering the plurality of phase matching based costs. For example, stereo matching module 103 as implemented via central processing units 1001 may determine the filtered cost volume. As discussed, in some examples, the plurality of phase matching based costs may include phase matching based costs at multiple scales. In such examples, determining the filtered cost volume may include generating multiple scaled filtered cost volumes and determining the filtered cost volume based on the multiple scaled filtered cost volumes. For example, determining the filtered cost volume based on the multiple scaled filtered cost volumes may include a cross scale cost volume filtering over the multiple scaled filtered cost volumes. Furthermore, the cross scale cost volume filtering may include an inter-scale regularizer. The phase matching based costs may be in any suitable phase domain such as a Fourier transform domain, a wavelet transform domain, or the like. For example, phase matching in the wavelet domain may include applying a dual tree complex wavelet transform to the first image data and the second image data to generate first wavelet coefficients for the first image data and second wavelet coefficients for the second image data such that the first and second wavelet coefficients are in multi-resolution.

Processing may continue at operation 903, "Generate Depth Data by Selecting Disparity Values based on the Filtered Cost Volume", where depth data may be generated based at least in part on a selection, for each pixel location of the individual pixel locations, of a selected disparity value based on the filtered cost volume. For example, the selection may include a winner-takes-all based selection. For example, stereo matching module 103 as implemented via central processing units 1001 may generate the depth data.

Process 900 may be repeated any number of times either in series or in parallel for any number of stereo images, image slices, or the like. As discussed, process 900 may provide for stereo image correspondence with high accuracy.

Various components of the systems described herein may be implemented in software, firmware, and/or hardware and/or any combination thereof. For example, various components of device 100, system 1000, system 1100, or device 1200 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, system 1000, system 1100, or device 1200, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
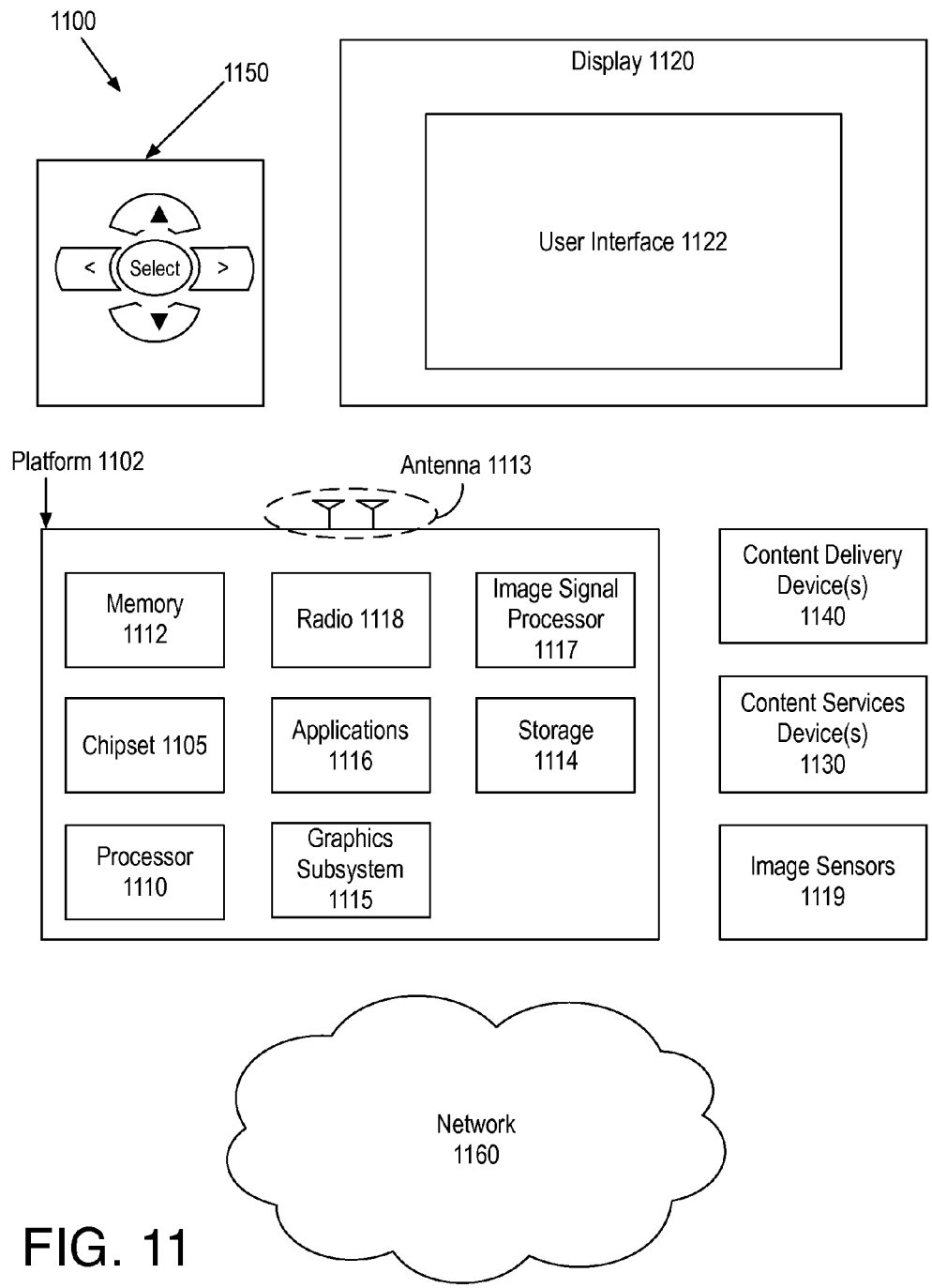
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other content sources such as image sensors 1119. For example, platform 1102 may receive stereo image data as discussed herein from image sensors 1119 or any other content source. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116, image signal processor 1117 and/or radio 1118. Chipset 1105 may provide intercommunication among processor 1110, memory 1112, storage 1114, graphics subsystem 1115, applications 1116, image signal processor 1117 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

Image sensors 1119 may include any suitable image sensors that may provide stereo image data based on a scene. For example, image sensors 1119 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1119 may include any device that may detect information of a scene to generate stereo image data. In some examples, system 1100 may include multiple image sensors 1119, which may be the same or different. In some examples, image sensors 1119 may provide image capture processing or logic associated with image sensors 1119 (not shown) such as stereo image calibration or rectification. In other examples, such image capture processing may be performed via platform 602.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/or display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
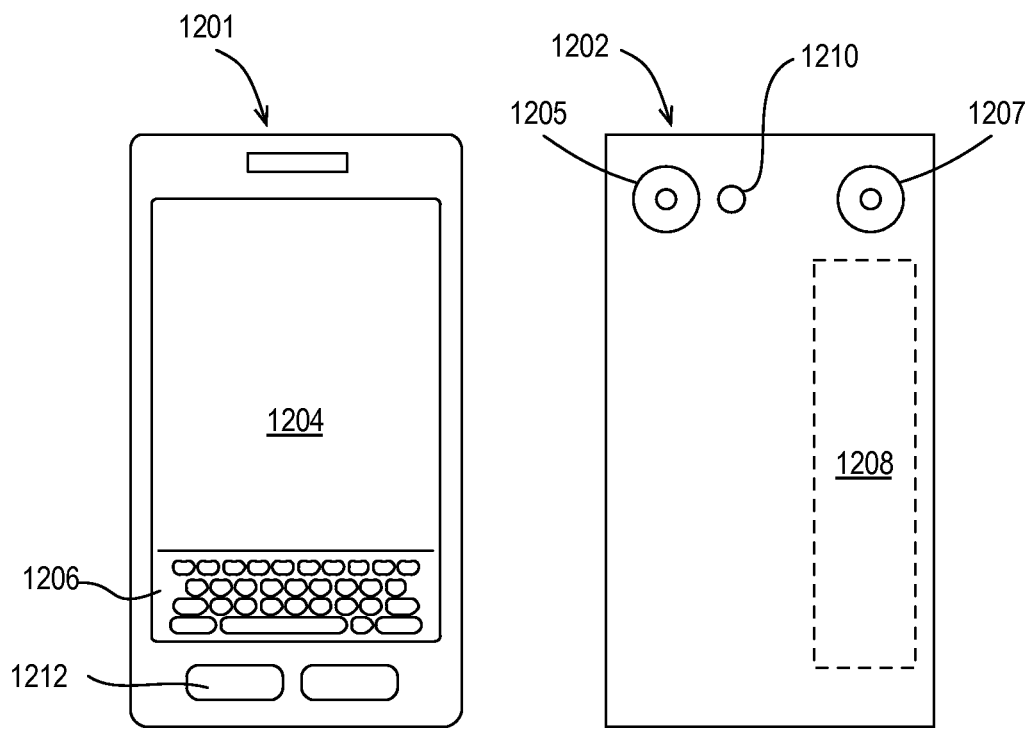
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, device 100 or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor), a camera 1207 (e.g., including a lens, an aperture, and an imaging sensor), and a flash 1210 integrated into back 1202 (or elsewhere) of device 1200. In other examples, cameras 1205, 1207, and flash 1210 may be integrated into front 1201 of device 1200 and/or additional cameras (e.g., such that device 1200 has front and back cameras) may be provided. Cameras 1205, 1207 may be components of a stereo camera module to originate stereo image data and/or stereo video data that may be output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for performing stereo image correspondence comprises determining a plurality of phase matching based costs associated with individual pixel locations of first image data and disparity values with respect to second image data, determining a filtered cost volume based at least in part on filtering the plurality of phase matching based costs, and generating depth data based at least in part on a selection, for each pixel location of the individual pixel locations, of a selected disparity value based on the filtered cost volume.

Further to the first embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes.

Further to the first embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes such that determining the filtered cost volume based on the multiple scaled filtered cost volumes comprises a cross scale cost volume filtering over the multiple scaled filtered cost volumes.

Further to the first embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes such that determining the filtered cost volume based on the multiple scaled filtered cost volumes comprises a cross scale cost volume filtering over the multiple scaled filtered cost volumes and such that the cross scale cost volume filtering comprises an inter-scale regularizer.

Further to the first embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes such that the phase matching based costs are based on phase matching in a wavelet transform domain.

Further to the first embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes such that the phase matching based costs are based on phase matching in a wavelet transform domain, the method further comprising applying a dual tree complex wavelet transform to the first image data and the second image data to generate first wavelet coefficients for the first image data and second wavelet coefficients for the second image data scuh that the first and second wavelet coefficients are in multi-resolution.

Further to the first embodiments, the phase matching based costs are based on phase matching in a Fourier transform domain.

Further to the first embodiments, the selection comprises a winner-takes-all based selection.

Further to the first embodiments, the method further comprises performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients.

Further to the first embodiments, the method further comprises performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients and such that the phase domain comprises at least one of a Fourier transform domain or a wavelet transform domain.

Further to the first embodiments, the method further comprises performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients, such that the first and second phase transform coefficients are in multi-resolution, such that the plurality of phase matching based costs comprise phase matching based costs at multiple scales associated with the multi-resolution, and such that determining the filtered cost volume comprises generating multiple scaled filtered cost volumes and determining the filtered cost volume based on the multiple scaled filtered cost volumes.

Further to the first embodiments, determining the filtered cost volume comprises applying at least one of a box filter, an anisotropic diffusion filter, a bilateral filter, a guided filter, or a non-local filter and segment tree.

In one or more second embodiments, a system for performing stereo image correspondence comprises a memory configured to receive first image data and second image data and a central processing unit coupled to the memory, the central processing unit to determine a filtered cost volume based at least in part a plurality of phase matching based costs associated with individual pixel locations of first image data and disparity values with respect to the second image data and to generate a disparity map based at least in part on a selection, for each pixel location of the individual pixel locations, of a selected disparity value based on the filtered cost volume.

Further to the second embodiments, the plurality of phase matching based costs comprise phase matching based costs at multiple scales and the central processing unit to determine the filtered cost volume comprises the central processing unit to generate multiple scaled filtered cost volumes and determine the filtered cost volume based on the multiple scaled filtered cost volumes.

Further to the second embodiments, the plurality of phase matching based costs comprise phase matching based costs at multiple scales and the central processing unit to determine the filtered cost volume comprises the central processing unit to generate multiple scaled filtered cost volumes and determine the filtered cost volume based on the multiple scaled filtered cost volumes such that the central processing unit to determine the filtered cost volume based on the multiple scaled filtered cost volumes comprises the central processing unit to apply a cross scale cost volume filter over the multiple scaled filtered cost volumes.

Further to the second embodiments, the plurality of phase matching based costs comprise phase matching based costs at multiple scales and the central processing unit to determine the filtered cost volume comprises the central processing unit to generate multiple scaled filtered cost volumes and determine the filtered cost volume based on the multiple scaled filtered cost volumes such that the central processing unit to determine the filtered cost volume based on the multiple scaled filtered cost volumes comprises the central processing unit to apply a cross scale cost volume filter over the multiple scaled filtered cost volumes and such that the cross scale cost volume filter comprises an inter-scale regularizer.

Further to the second embodiments, the plurality of phase matching based costs comprise phase matching based costs at multiple scales and the central processing unit to determine the filtered cost volume comprises the central processing unit to generate multiple scaled filtered cost volumes and determine the filtered cost volume based on the multiple scaled filtered cost volumes such that the phase matching based costs are based on phase matching in a wavelet transform domain.

Further to the second embodiments, the plurality of phase matching based costs comprise phase matching based costs at multiple scales and the central processing unit to determine the filtered cost volume comprises the central processing unit to generate multiple scaled filtered cost volumes and determine the filtered cost volume based on the multiple scaled filtered cost volumes such that the phase matching based costs are based on phase matching in a wavelet transform domain, such that the central processing unit is further to apply a dual tree complex wavelet transform to the first image data and the second image data to generate first wavelet coefficients for the first image data and second wavelet coefficients for the second image data, and such that the first and second wavelet coefficients are in multi-resolution.

Further to the second embodiments, the phase matching based costs are based on phase matching in a Fourier transform domain.

Further to the second embodiments, the selection comprises a winner-takes-all based selection.

Further to the second embodiments, the central processing unit is further to perform a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients.

Further to the second embodiments, the central processing unit is further to perform a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients and such that the phase domain comprises at least one of a Fourier transform domain or a wavelet transform domain.

Further to the second embodiments, the central processing unit is further to perform a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients, such that the first and second phase transform coefficients are in multi-resolution, such that the plurality of phase matching based costs comprise phase matching based costs at multiple scales associated with the multi-resolution, and such that the central processing unit to determine the filtered cost volume comprises the central processing unit to generate multiple scaled filtered cost volumes and determine the filtered cost volume based on the multiple scaled filtered cost volumes.

Further to the second embodiments, the central processing unit to determine the filtered cost volume comprises the central processing unit to apply at least one of a box filter, an anisotropic diffusion filter, a bilateral filter, a guided filter, or a non-local filter and segment tree.

In one or more third embodiments, a system for performing stereo image correspondence comprises means for determining a plurality of phase matching based costs associated with individual pixel locations of first image data and disparity values with respect to second image data, means for determining a filtered cost volume based at least in part on filtering the plurality of phase matching based costs, and means for generating depth data based at least in part on a selection, for each pixel location of the individual pixel locations, of a selected disparity value based on the filtered cost volume.

Further to the third embodiments, the plurality of phase matching based costs comprise phase matching based costs at multiple scales and the means for determining the filtered cost volume comprise means for generating multiple scaled filtered cost volumes and means for determining the filtered cost volume based on the multiple scaled filtered cost volumes.

Further to the third embodiments, the plurality of phase matching based costs comprise phase matching based costs at multiple scales and the means for determining the filtered cost volume comprise means for generating multiple scaled filtered cost volumes and means for determining the filtered cost volume based on the multiple scaled filtered cost volumes such that the means for determining the filtered cost volume based on the multiple scaled filtered cost volumes comprise means for performing a cross scale cost volume filtering over the multiple scaled filtered cost volumes.

Further to the third embodiments, the plurality of phase matching based costs comprise phase matching based costs at multiple scales and the means for determining the filtered cost volume comprise means for generating multiple scaled filtered cost volumes and means for determining the filtered cost volume based on the multiple scaled filtered cost volumes such that the means for determining the filtered cost volume based on the multiple scaled filtered cost volumes comprise means for performing a cross scale cost volume filtering over the multiple scaled filtered cost volumes and such that the cross scale cost volume filtering comprises an inter-scale regularizer.

Further to the third embodiments, the plurality of phase matching based costs comprise phase matching based costs at multiple scales and the means for determining the filtered cost volume comprise means for generating multiple scaled filtered cost volumes and means for determining the filtered cost volume based on the multiple scaled filtered cost volumes such that the phase matching based costs are based on phase matching in a wavelet transform domain.

Further to the third embodiments, the plurality of phase matching based costs comprise phase matching based costs at multiple scales and the means for determining the filtered cost volume comprise means for generating multiple scaled filtered cost volumes and means for determining the filtered cost volume based on the multiple scaled filtered cost volumes such that the phase matching based costs are based on phase matching in a wavelet transform domain, the system further comprising means for applying a dual tree complex wavelet transform to the first image data and the second image data to generate first wavelet coefficients for the first image data and second wavelet coefficients for the second image data such that the first and second wavelet coefficients are in multi-resolution.

Further to the third embodiments, the phase matching based costs are based on phase matching in a Fourier transform domain.

Further to the third embodiments, the selection comprises a winner-takes-all based selection.

Further to the third embodiments, the system further comprises means for performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients.

Further to the third embodiments, the system further comprises means for performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients and such that the phase domain comprises at least one of a Fourier transform domain or a wavelet transform domain.

Further to the third embodiments, the system further comprises means for performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients, such that the first and second phase transform coefficients are in multi-resolution, such that the plurality of phase matching based costs comprise phase matching based costs at multiple scales associated with the multi-resolution, and such that the means for determining the filtered cost volume comprise means for means for generating multiple scaled filtered cost volumes and means for determining the filtered cost volume based on the multiple scaled filtered cost volumes.

Further to the third embodiments, the means for determining the filtered cost volume comprises means for applying at least one of a box filter, an anisotropic diffusion filter, a bilateral filter, a guided filter, or a non-local filter and segment tree.

In one or more fourth embodiments, at least one machine readable medium comprises a plurality of instructions that, in response to being executed on a device, cause the device to perform stereo image correspondence by determining a plurality of phase matching based costs associated with individual pixel locations of first image data and disparity values with respect to second image data, determining a filtered cost volume based at least in part on filtering the plurality of phase matching based costs, and generating depth data based at least in part on a selection, for each pixel location of the individual pixel locations, of a selected disparity value based on the filtered cost volume.

Further to the fourth embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes.

Further to the fourth embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes such that determining the filtered cost volume based on the multiple scaled filtered cost volumes comprises a cross scale cost volume filtering over the multiple scaled filtered cost volumes.

Further to the fourth embodiments, the plurality of phase matching based costs comprise phase matching based costs at multiple scales and determining the filtered cost volume comprises generating multiple scaled filtered cost volumes and determining the filtered cost volume based on the multiple scaled filtered cost volumes such that the phase matching based costs are based on phase matching in a wavelet transform domain.

Further to the fourth embodiments, the machine readable medium comprises further instructions that, in response to being executed on the device, cause the device to perform stereo image correspondence by performing a transform on the first image data and the second image data to generate first phase transform coefficients and second phase transform coefficients in a phase domain such that the plurality of phase matching based costs comprise phase difference values based at least in part on the first phase transform coefficients and the second phase transform coefficients.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing stereo image correspondence comprising:
    determining a plurality of phase matching based costs associated with individual pixel locations of first image data and disparity values with respect to second image data;
    determining multiple filtered cost volumes, each volume being of a different scale, and each based at least in part on filtering the plurality of phase matching based costs, wherein the depth of the volume is a plurality of disparity values of each pixel location within the volume; and
    generating depth data based at least in part on a selection, for each pixel location of the individual pixel locations, of a selected disparity value based on the filtered cost volume.

2. The method of claim 1, wherein the plurality of phase matching based costs comprise phase matching based costs at multiple scales and wherein determining the filtered cost volume comprises generating the multiple scaled filtered cost volumes and determining the filtered cost volume based on the multiple scaled filtered cost volumes.

3. The method of claim 2, wherein determining the filtered cost volume based on the multiple scaled filtered cost volumes comprises a cross scale cost volume filtering over the multiple scaled filtered cost volumes.

4. The method of claim 3, wherein the cross scale cost volume filtering comprises an inter-scale regularizer providing a penalty for inconsistency between scales.

5. The method of claim 2, wherein the phase matching based costs are based on phase matching in a wavelet transform domain.

6. The method of claim 5, further comprising:
    applying a dual tree complex wavelet transform to the first image data and the second image data to generate first wavelet coefficients for the first image data and second wavelet coefficients for the second image data, wherein the first and second wavelet coefficients are in multi-resolution.

7. The method of claim 1, wherein the phase matching based costs are based on phase matching in a Fourier transform domain.

8. The method of claim 1, wherein the selection comprises a winner-takes-all based selection.

9. The method of claim 1, further comprising:
    performing a transform on the first image data and the second image data to generate first phase transform coefficients and second phase transform coefficients in a phase domain,
    wherein the plurality of phase matching based costs comprise phase difference values based at least in part on the first phase transform coefficients and the second phase transform coefficients.

10. The method of claim 9, wherein the phase domain comprises at least one of a Fourier transform domain or a wavelet transform domain.

11. The method of claim 9, wherein the first and second phase transform coefficients are in multi-resolution, wherein the plurality of phase matching based costs comprise phase matching based costs at multiple scales associated with the multi-resolution, and wherein determining the filtered cost volume comprises generating multiple scaled filtered cost volumes and determining the filtered cost volume based on the multiple scaled filtered cost volumes.

12. The method of claim 1, wherein determining the filtered cost volume comprises applying at least one of a box filter, an anisotropic diffusion filter, a bilateral filter, a guided filter, or a non-local filter and segment tree.

13. A system for performing stereo image correspondence comprising:
    a memory configured to receive first image data and second image data; and
    a central processing unit coupled to the memory, the central processing unit to determine multiple filtered cost volumes, each volume being of a different scale, and each filtered cost volume based at least in part on a plurality of phase matching based costs associated with individual pixel locations of first image data and disparity values with respect to the second image data, wherein the depth of the volume is a plurality of disparity values of each pixel location within the volume and to generate a disparity map based at least in part on a selection, for each pixel location of the individual pixel locations, of a selected disparity value based on the filtered cost volume.

14. The system of claim 13, wherein the plurality of phase matching based costs comprise phase matching based costs at multiple scales and wherein the central processing unit to determine the filtered cost volume comprises the central processing unit to generate the multiple scaled filtered cost volumes and determine the filtered cost volume based on the multiple scaled filtered cost volumes.

15. The system of claim 14, wherein the central processing unit to determine the filtered cost volume based on the multiple scaled filtered cost volumes comprises the central processing unit to apply a cross scale cost volume filter over the multiple scaled filtered cost volumes.

16. The system of claim 14, wherein the phase matching based costs are based on phase matching in a wavelet transform domain.

17. The system of claim 16, wherein the central processing unit is further to apply a dual tree complex wavelet transform to the first image data and the second image data to generate first wavelet coefficients for the first image data and second wavelet coefficients for the second image data, and wherein the first and second wavelet coefficients are in multi-resolution.

18. The system of claim 13, wherein the phase matching based costs are based on phase matching in a Fourier transform domain.

19. The system of claim 13, wherein the central processing unit is further to perform a transform on the first image data and the second image data to generate first phase transform coefficients and second phase transform coefficients in a phase domain, and wherein the plurality of phase matching based costs comprise phase difference values based at least in part on the first phase transform coefficients and the second phase transform coefficients.

20. The system of claim 19, wherein the first and second phase transform coefficients are in multi-resolution, wherein the plurality of phase matching based costs comprise phase matching based costs at multiple scales associated with the multi-resolution, and wherein the central processing unit to determine the filtered cost volume comprises the central processing unit to generate multiple scaled filtered cost volumes and determine the filtered cost volume based on the multiple scaled filtered cost volumes.

21. At least one non-transitory machine readable medium comprising a plurality of instructions that, in response to being executed on a device, cause the device to perform stereo image correspondence by:

determining a plurality of phase matching based costs associated with individual pixel locations of first image data and disparity values with respect to second image data;

determining multiple filtered cost volumes, each volume being of a different scale, and each based at least in part on filtering the plurality of phase matching based costs, wherein the depth of the volume is a plurality of disparity values of each pixel location within the volume; and generating depth data based at least in part on a selection, for each pixel location of the individual pixel locations, of a selected disparity value based on the filtered cost volume.

22. The machine readable medium of claim 21, wherein the plurality of phase matching based costs comprise phase matching based costs at multiple scales and wherein determining the filtered cost volume comprises generating the multiple scaled filtered cost volumes and determining the filtered cost volume based on the multiple scaled filtered cost volumes.

23. The machine readable medium of claim 22, wherein determining the filtered cost volume based on the multiple scaled filtered cost volumes comprises a cross scale cost volume filtering over the multiple scaled filtered cost volumes.

24. The machine readable medium of claim 22, wherein the phase matching based costs are based on phase matching in a wavelet transform domain.

25. The machine readable medium of claim 21, the machine readable medium comprising further instructions that, in response to being executed on the device, cause the device to perform stereo image correspondence by:

performing a transform on the first image data and the second image data to generate first phase transform coefficients and second phase transform coefficients in a phase domain, wherein the plurality of phase matching based costs comprise phase difference values based at least in part on the first phase transform coefficients and the second phase transform coefficients.

* * * * *